United States Patent [19]
Pollard

[11] Patent Number: 5,895,478
[45] Date of Patent: Apr. 20, 1999

[54] RIGHT AND CENTER FONT JUSTIFICATION FOR A DOCUMENT SYSTEM LIBRARY

[75] Inventor: Larry C. Pollard, Denver, Colo.

[73] Assignees: U S WEST, Inc., Denver; MediaOne Group, Inc., Englewood, both of Colo.

[21] Appl. No.: 08/695,247

[22] Filed: Aug. 8, 1996

[51] Int. Cl.⁶ .................................................. G06F 15/62
[52] U.S. Cl. ............................................................ 707/519
[58] Field of Search ................................. 707/517–519, 707/531, 521, 522; 345/467–472, 144

[56] References Cited

U.S. PATENT DOCUMENTS

| | | | |
|---|---|---|---|
| 4,783,760 | 11/1988 | Carosso | 707/519 |
| 5,299,303 | 3/1994 | Fukunaga | 707/518 |
| 5,724,498 | 3/1998 | Nussbaum | 345/471 |

OTHER PUBLICATIONS

Nelson, "Mastering WordPerfect on the Macintosh," SYBEX Inc., pp. 198–208, Dec. 1988.

*Primary Examiner*—Mark R. Powell
*Attorney, Agent, or Firm*—Brooks & Kushman

[57] ABSTRACT

A method is disclosed for using a computer to provide justification of a plurality of characters and fonts in a plurality of text strings within a document from a document system library. Document files from a document system library are obtained and relevant information is transferred to a dBase II relational database. Character and font information for each character in a text string is identified so that the location and length of a text string can be determined. The text string is then manipulated as required for a desired justification.

7 Claims, 1 Drawing Sheet

RIGHT AND CENTER FONT JUSTIFICATION FOR A DOCUMENT SYSTEM LIBRARY

TECHNICAL FIELD

This invention relates to an automated method for justifying fonts and characters in a document.

BACKGROUND ART

As technology becomes increasingly sophisticated, document processing applications have consistently kept pace to offer innovative features and options. Document processing has thus evolved from typewritten pages to computer generated spreadsheets, macros and the like.

One area of document processing which has received much attention is formatting. As used in the art, the term formatting relates to the ability of an application program, typically a word processing program, to fashion a document to conform to detailed specifications so as to provide a user with greater control over the look and feel of the generated output. For example, using presently available software, a page can be formatted to include various logos, fonts and characters in a variety of styles, sizes and locations. As a result, each page in a document may be laid out in a manner which is both artistically and visually pleasing to a reader.

Against this background, the ability to control the justification or alignment of a given set of lines on a page has become a useful document processing feature. As those skilled in the art will recognize, justification provides a user with a number of formatting options, including, for example, the choices of centering selected text, as well as, aligning the text at either the left or right margins. Using this feature, a user may justify certain sections or an entire text depending on each individual application and the corresponding printing constraints.

According to custom, document titles or section headings are generally center justified. Similarly, charts and tables are often left justified for visual effect. Word processing programs have thus been structured to allow a user to designate particular lines from the document for right, left and center justification.

While formatting features are well known in word processing programs, they have heretofore been unavailable for use in document system libraries. Typically, documents which are generated from such libraries are done so according to predefined formatting and justification rules which may not be modified by a user. As a result, the format of the generated document may often times be unsuitable for a desired application, especially when retrieved years after its original production.

Consequently, there exists a need for a method of justification of a plurality of fonts and a plurality of characters in a text string within a document generated from a document system library.

SUMMARY OF THE INVENTION

It is an object of the present invention to provide a method for justification of fonts and characters for use with a relational database.

It is also an object of the present invention to determine a list of the fonts and characters and their associated characteristics from a document system library.

It is a further object of the present invention to determine a required offset to move a text string to its desired justification based on the characters and fonts in the text string and their associated characteristics.

In carrying out the above objects, the present invention provides a method for justification of a plurality of fonts and a plurality of characters in a text string within a document, for use with a computer having a processor and memory.

The method first involves identifying a list of the characters and fonts in the document and a list of the characteristics for each, including a font width, character width and whether the font is proportional or fixed. Having identified the list of characters, fonts, and characteristics, the information is thereafter stored in memory.

For each character within each font, printing information is then identified. The printing information provides the printer with a detailed set of guidelines by which to print each character.

To establish the location of each text string designated for justification, a beginning x and y coordinate is determined for the text string. Based on the justification selected, a desired x coordinate position is next determined for each text string. Having ascertained the desired x coordinate position for the text string and the beginning x coordinate of the text string, a required offset can then be calculated. The required offset provides information regarding how each text string should be moved to reach the desired x coordinate position. Lastly, each font is moved according to its required offset to achieve the desired justification.

The step of identifying printing information for each character within each font, further includes the step of obtaining a coded font name, a code page or a character set name and a number of code points for a code page, a graphic identifier and an orientation index field for each character within each font from the text string to provide a character's printing information.

The present invention further provides a method for determining a beginning x and y coordinate for each text string based on the number of code points for the code page.

The objects, features, and advantages of the present invention are readily apparent from the following detailed description of the best mode for carrying out the invention when taken in connection with the accompanying drawings.

DESCRIPTION OF THE PREFERRED EMBODIMENT

Figure 1:
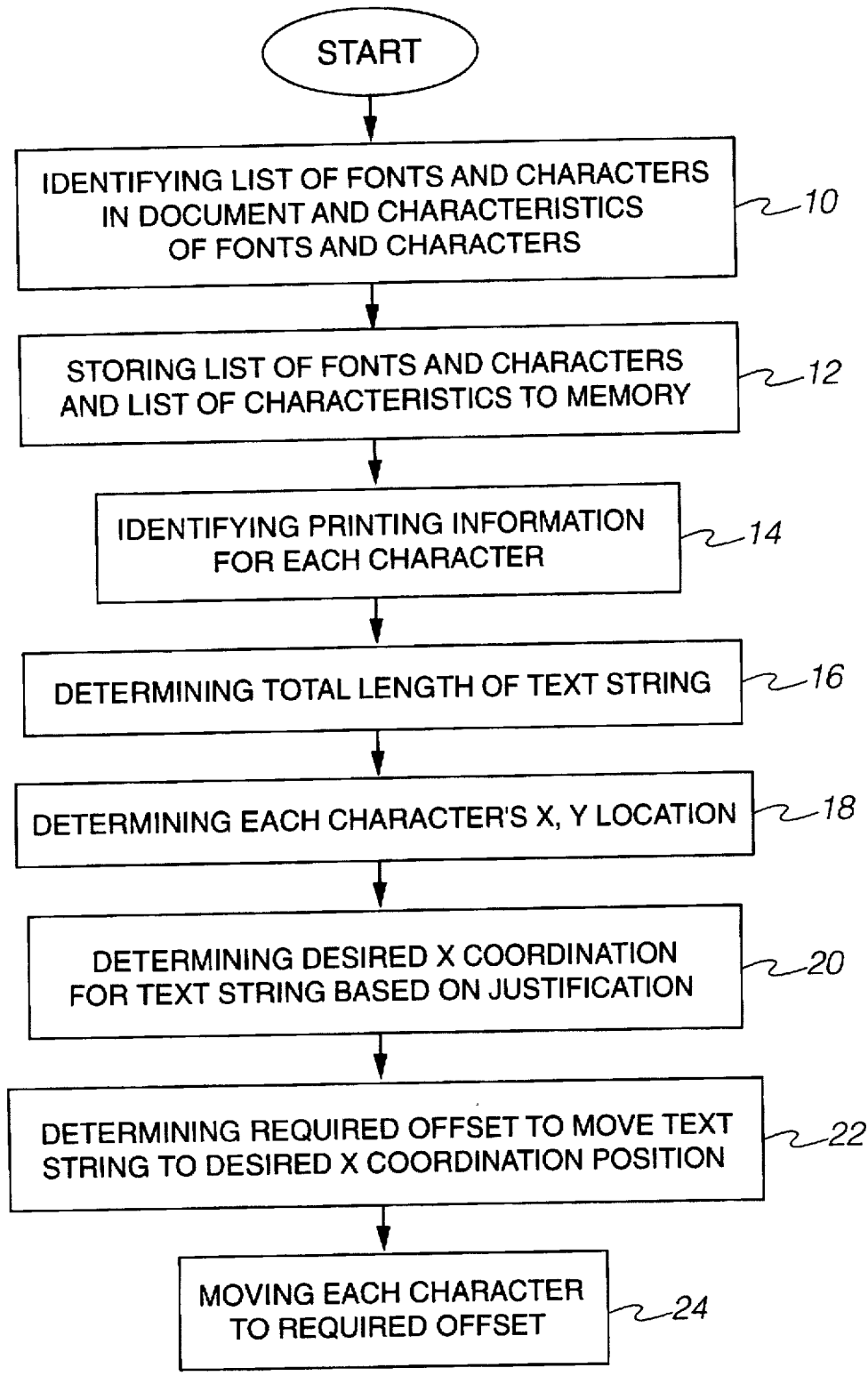
FIG. 1 is a flow diagram of a method for right and center justification of fonts and characters in a text string within a document in accordance with the present invention.

The present invention provides a method for justification of characters and fonts in a text string within a document for use in connection with a computer having a processor and memory.

Referring to FIG. 1, the method for providing justification, involves identifying 10 a list of fonts and characters in the document and a list of associated characteristics for each font and character. The list of characteristics includes a font width, whether the font is proportional or fixed and a character width.

In the preferred embodiment, files in a document system library are opened, information, such as font width and points is obtained, and the files are closed. Most main frame computer languages such as cobol or assembler cannot open, extract and close files within multiple members of a partition data set. Thus in the preferred embodiment a C mainframe program in conjunction with a utility tool such as, for example, C-LIST (IBM) or set is created to achieve these functions. With the use of a C program, relevant information can be extracted from the document system library and transferred into a relational database such as, for example, dBase II.

In a preferred embodiment, there are two files that are created from the information within the document system library. A first file which includes a listing of all the files, a list of all fonts within the files and whether the font is proportional or fixed. The second file includes a listing of every character in each font and the widths of every proportional font and every character. Thereafter, the list of fonts and characters and the list of the characteristics for each font and character are stored 12 in memory.

In keeping with the invention, the information extracted from the system library is used to create print interface tables from which information can be readily accessed. Preferably, two print interface tables are created. A first table is created for the first file, directed to information for proportional fonts. A second table is created for the second file, having print information for each character and font. These tables are then uploaded to a relational database, preferably dBase II.

In the document system library, blocks of the text string desired for justification are identified by their logical font name. A logical font name, such as Helvetica 10, Courier 12 or Prestige 8, provides a name of the font style, together with the point value or height dimensions for each character. Such information is necessary to determine the characteristics of each character. A point represents the number of letters per inch which will be displayed by the printer. To determine the overall height based on the number of points, the conversion provides 72 points in an inch. A point value then provides a height dimension for each character. Additionally, the point value is then converted into whatever unit of measurement is recognized by the printer to be used. The point value, for an IBM printer, for example, would be converted from a point value to pelles value. As there are 720 pelles per point, the conversion can be readily calculated onto a unit of measurement which is recognized by the IBM printer.

The width of each font is dependent on whether the font is a fixed font or a proportional font. In a proportional font, the width of each font varies relative to the designated height to make the overall document more readable and to prevent gaps between characters. The width is adjusted relative to the height. With a fixed font, the width is a constant value.

Still referring to FIG. 1, printing information is identified 14 for each character within each font. This information is again obtained from the relational database. From the database, there is supplied a logical font name, such as Helvetica 10.

For each logical font name, there is a coded font, written in hexadecimal advance function printing code, which converts the logical font name to a physical font name which the printer recognizes. Each coded font includes the name of the character set and the code page that belongs with the coded font. The character set and code page constitute a hexadecimal representation of a text string. In particular, the character set forms a language command that tells the printer how to print a specific character or a set of characters. The code page reveals advance function printing codes that provide a representation of each character in hexadecimal language for the printer. With a combination of the coded font name and code page or a character set name and a number of code points for a code page, a printer has the requisite instructions to produce the desired character.

In addition, a graphic identifier and an orientation index field are preferably obtained for each character within each font of the text string to provide an orientation for each character and set out the character's location within the page.

Thereafter, a total length of the text string designated for justification is determined 16. With the total length of the text string, each text string can be justified as designated. To obtain the width of the text string, the width of each character in the text string is added and the sum of the character widths then constitutes the width of the text string.

For each text string, a beginning x and y coordinate is determined 18 to obtain the starting position or location of the text string. Following this calculation, a desired x coordinate position is determined, 20, for each text string based on the justification desired. For example, if the text string is to be right justified, an x coordinate position for right justification would be obtained based on an individual page and its right margin setting. Similarly, if center justification is desired, again in light of the margin settings for the page, a center x coordinate position can be determined.

With a desired x coordinate position and a beginning x coordinate position, a required offset can be determined, 22. The required offset determines how each text string should be moved to reach its desired x coordinate position.

For right justification, the difference between the total length of the text string and the desired x coordinate position for the text string provides the required offset. Similarly, for center justification, given the total length of the text string, and the margins which determine the maximum length of the text string, the difference between the two constitutes the available space remaining. For center justification, the remaining space is divided by two and the resulting figure is the required offset to move each text string from its beginning x coordinate location to its desired x coordinate position for center justification. Lastly, each character is then moved, 24, according to the required offset to achieve the desired justification.

Accordingly, the present invention takes files form a document system library, transfers relevant information from the files and loads the information to a relational database, from which the information can be manipulated as necessary for a desired justification.

While the best modes for carrying out the invention has been described in detail, those familiar with the art to which this invention relates will recognize various alternative designs and embodiments for practicing the invention as defined by the following claims.

What is claimed is:

1. For use with a computer having a processor and memory, a method for justification of a plurality of fonts and a plurality of characters in a text string within a document, comprising:

generating a list of the fonts and characters in the document and a list of associated characteristics, the list of characteristics including a character width for all characters within each font, a font width and whether the font is proportional or fixed;

storing the list of fonts and characters and the associated list of characteristics in memory;

determining printing information for each character within each font;

determining a total length of a text string designated for justification in the document;

determining a beginning x and y coordinate for the text string to establish the text string's location;

determining a desired x coordinate position for the text string based on the justification desired;

determining a required offset to move each text string to its desired x coordinate position based on the beginning x coordinate position and the desired x coordinate position; and moving each font within the designated text string according to its required offset to achieve the desired justification.

2. The method of claim 1, further comprising the step of:

translating the list of fonts and characters and the list of characteristics for each font and character from a hexadecimal number to an integer value.

3. The method of claim 1, wherein the step of identifying printing information for each character within each font, further comprises:

obtaining a coded font name, a code page or a character set name and a number of code points for a code page, a graphic identifier and an orientation index field for each character within each font from the text string to provide a character's printing information.

4. The method of claim 1, wherein the step of determining a total length of the text string in the document further comprises:

adding the widths of each character in the text string from the memory.

5. The method of claim 1, wherein the step of determining a beginning x and y coordinate for each character in the text string is based on the number of code points for the code page to provide a character location.

6. For use with a computer having a memory and processor, a method for justification of a plurality of fonts and a plurality of characters in a text string within a document, comprising:

generating a list of the fonts and characters in the document and a list of the characteristics for each font and character, the list of characteristics including a font width, a character width and whether the font is proportional or fixed;

storing the list of fonts and characters and the list of characteristics for the characters and fonts in memory;

identifying printing information for each character within each font, further comprising:

obtaining a coded font name, a code page or a character set name and a number of code points for a code page, a graphic identifier and an orientation index field for each character within each font from the text string to provide a character's printing information;

determining a total length of the text string in the document;

determining an x and y coordinate for each character in the text string to provide each character's location;

determining a desired x coordinate position for each text string based on the justification desired;

determining a required offset to move each text string to its desired x coordinate position based on the beginning x coordinate position and the desired x coordinate position; and moving each font according to its required offset to achieve the desired justification.

7. For use with a computer having a processor and memory, a method for justification of a plurality of fonts and characters in a plurality of text strings within a document, comprising:

generating a list of the fonts and characters in the document and a list of associated characteristics, the list of characteristics including a character width for all characters within each font, a font width and whether the font is proportional or fixed;

storing the list of fonts and characters and the associated list of characteristics in memory;

determining printing information for each character within each font;

determining a total length of each text string designated for justification in the document;

determining a beginning x and y coordinate for each of the designated text strings to establish the text string's location;

determining a desired x coordinate position for each of the text strings based on the justification desired;

determining a required offset to move each text string to its desired x coordinate position based on the beginning x coordinate position and the desired x coordinate position; and moving each character within each designated text string according to its required offset to achieve the desired justification.

* * * * *